United States Patent [19]

Kamemoto et al.

[11] Patent Number: 4,658,585
[45] Date of Patent: Apr. 21, 1987

[54] MASTER CYLINDER RESERVOIR

[75] Inventors: Katsuaki Kamemoto; Hideyuki Morimoto, both of Yokosuka, Japan

[73] Assignee: Nippon Air Brake Co., Ltd., Japan

[21] Appl. No.: 906,560

[22] Filed: Sep. 8, 1986

Related U.S. Application Data

[63] Continuation of Ser. No. 681,377, Dec. 13, 1984, abandoned.

[30] Foreign Application Priority Data

Dec. 28, 1983 [JP] Japan ................. 58-202105

[51] Int. Cl.⁴ .................................................. F15B 7/10
[52] U.S. Cl. ........................................ 60/592; 92/98 R
[58] Field of Search ................. 60/585, 592; 92/98 R

[56] References Cited

U.S. PATENT DOCUMENTS

| 3,483,800 | 12/1969 | Golden | 92/98 R |
| 3,654,956 | 4/1972 | Tsubouchi | 60/585 |
| 3,983,902 | 10/1976 | Lord | 92/98 R |
| 4,103,492 | 8/1978 | Sakazume | 60/592 |
| 4,200,163 | 4/1980 | Bass et al. | 60/592 |
| 4,393,655 | 7/1983 | Komorizono | 60/592 |
| 4,407,125 | 10/1983 | Parsons | 60/592 |
| 4,466,339 | 8/1984 | Huddle | 92/98 R |
| 4,615,175 | 10/1986 | Ishiwata | 60/592 |

FOREIGN PATENT DOCUMENTS 2111148  6/1983  United Kingdom ............... 60/592

Primary Examiner—Abraham Hershkovitz
Attorney, Agent, or Firm—Kane, Dalsimer, Kane, Sullivan and Kurucz

[57] ABSTRACT

A master cylinder reservoir includes a cylindrical body having an open upper end. A cap is fitted on and removably secured to the body, the cap engaging the open end of the body at a lower end portion thereof. The cap has a mounting portion formed adjacent to the lower end portion thereof. The mounting portion defines together with the upper surface of the open end of the body a circumferential space. The mounting portion has a first surface disposed in opposed spaced relation to the upper surface of the open end of the body. The mounting portion has a second surface disposed in opposed relation to the outer surface of the upper end of the body. The outer surface of the upper end is spaced from the second surface adjacent to the upper surface of the body to form a circumferential recess. A diaphragm received in the cap and having a peripheral portion received in the circumferential space and held between the first surface of the mounting portion and the upper surface of the open end of the body. The peripheral portion having a circumferential bead formed on a lower surface thereof, the bead being held in sealing engagement with the upper surface of the open end of the body. The peripheral portion of the diaphragm has an engaging section depending from its outer edge. The engaging section is received in the circumferential recess for engagement with the outer surface of the upper end of the body.

4 Claims, 6 Drawing Figures

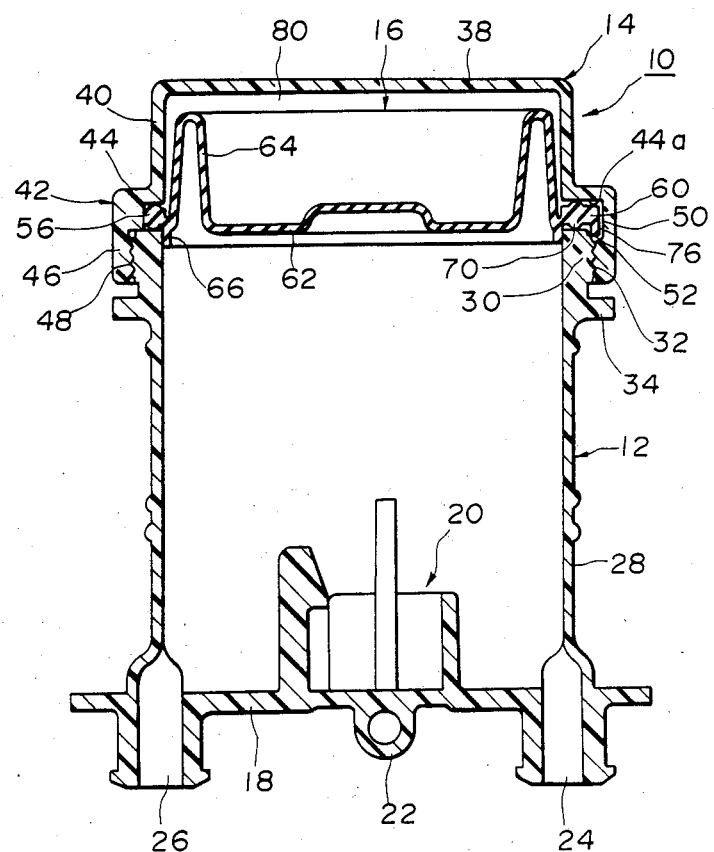

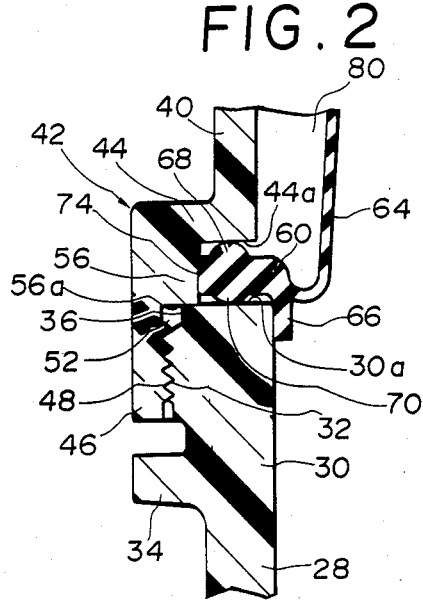
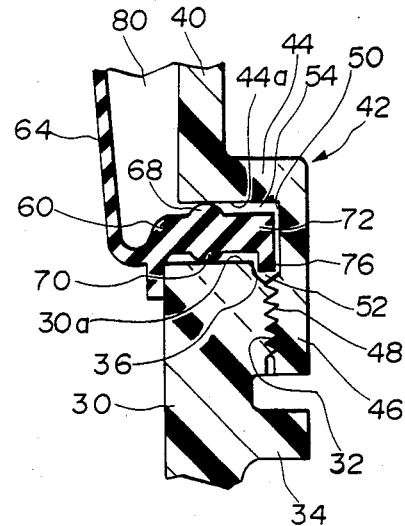
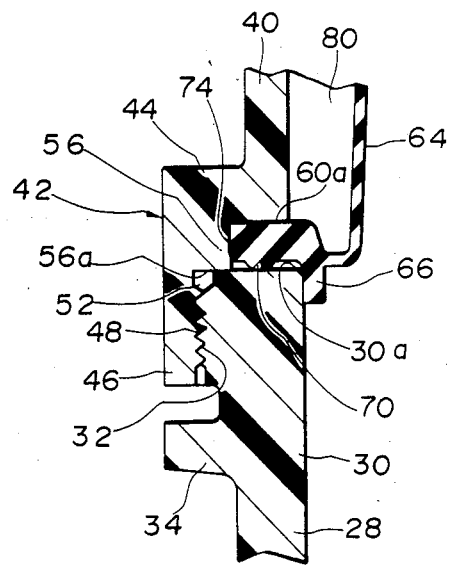

MASTER CYLINDER RESERVOIR

This is continuation of co-pending application Ser. No. 681,377 filed on 12/13/84, now abandoned.

BACKGROUND OF THE INVENTION

1. Field of the Invention

This invention relates to a fluid reservoir for a master cylinder for use in brake and clutch systems of a vehicle and particularly to such a reservoir provided with a diaphragm.

2. Prior Art

One known master cylinder reservoir comprises a cylindrical body having an open upper end, the body having fluid feed ports at its lower portion, a cap removably secured to the open end of the reservoir body, for example, through a threaded connecton, and a diaphragm received in the cap and having a peripheral portion held between the upper surface of the open end of the reservoir body and a mounting portion of the cap disposed in opposed relation to the upper surface of the open end. The diaphragm is made of an elastic material such as rubber so that it can be deformed when subjected to a pressure differential created thereacross. When assembling the master cylinder reservoir, a required amount of fluid is introduced into the reservoir body. Then, the cap is rotated relative to the reservoir body to make the threaded connection therebetween with the peripheral portion of the diaphragm being interposed between the upper surface of the open end of the reservoir body and the mounting portion of the cap, so that the reservoir body is sealed by the diaphragm. As the cap is rotated relative to the reservoir body, the peripheral portion of the diaphragm is subjected to a distortion or deformation due mainly to a friction between the upper surface thereof and the mounting portion of the cap and a friction between the lower surface thereof and the upper surface of the open end of the reservoir body. This distortion affects the sealing of the reservoir body by the diaphragm. To overcome this problem, it has been proposed to mount a slide ring, made of a material having a low coefficient of friction such as a plastics material, between the upper surface of the peripheral portion and the mounting portion of the cap. The reason why the slide ring is mounted only on the upper surface of the peripheral portion of the diaphragm is that the lower surface of the peripheral portion must be held in sealing engagement with the upper surface of the open end of the reservoir body while the upper surface of the peripheral portion does not need to be held in sealing engagement with the mounting portion of the cap. For example, the master cylinder reservoir provided with such a slide ring is shown in U.S. Pat. No. 4,103,492. However, unless the slide ring is positioned in place when attaching the cap to the reservoir body, the slide ring does not achieve the intended purpose. In addition, the assembly of the master cylinder reservoir become rather cumbersome and requires more time and labor because the component parts are increased by the use of the slide ring.

To overcome this difficult, it has also proposed to provide projections on the mounting portion of the cap which projections are snugly fitted respectively in notches formed in the peripheral portion of the diaphragm. With this construction, the diaphragm is attached to the cap against rotation, and the projections are of such a height that the lower surfaces of the projections are brought into engagement with the upper surface of the open end of the reservoir body, thereby preventing an undue distortion or deformation of the peripheral portion of the diaphragm. Such a master cylinder reservoir is disclosed in Japanese Utility Model Application No. 57-138,585 filed on Sept. 13, 1982 and laid open to public inspection on Mar. 21, 1984. However, the compressed peripheral portion interposed between the cap and the reservoir body is still forced radially inwardly when the master cylinder reservoir is assembled, so that the diaphragm is not positioned in place between the cap and the reservoir body. This problem will not occur if the cap is not tighened hard relative to the reservoir body. However, the master cylinder mounted on a vehicle is subjected to substantial vibration, and therefore in practical use, the cap must be tightened hard enough to ensure the sealing of the reservoir body by the diaphragm. Since the cap and the reservoir body are made of plastics material, they are subjected to a deformation when tightening the cap relative to reservoir body. As a result, the peripheral portion of the diaphragm is subjected to an undue deformation despite the provision of the projections.

SUMMARY OF THE INVENTION

It is therefore an object of this invention to provide a master cylinder reservoir in which the peripheral portion of the diaphragm held between the cap and the reservoir body is not subjected to an undue distortion or deformation.

According to the present invention, there is provided a master cylinder reservoir which comprising (a) a cylindrical body having an open upper end, the body having fluid feed means at a lower end portion thereof; (b) a cap fitted on and removably secuerd to the body, the cap engaging the open end of the body at a lower end portion thereof, the cap having a mounting portion formed adjacent to the lower end portion thereof, the mounting portion defining together with the upper surface of the open end of the body a circumferential space, the mounting portion having a first surface disposed in opposed spaced relation to the upper surface of the open end of the body, and the mounting portion of the cap having a second surface disposed in opposed relation to the outer surface of the upper end of the body, the outer surface of the upper end being spaced from the second surface adjacent to the upper surface of the body to form a circumferential recess; and (c) a diaphragm received in the cap and having a peripheral portion received in the end of the body, and the peripheral portion having an engaging section depending from its outer edge, and the engaging section being received in the circumferential recess for engagement with the outer surface of the upper end of the body.

BRIEF DESCRIPTION OF THE DRAWINGS

FIG. 1 is a cross-sectional view of a master cylinder reservoir provided in accordance with the present invention;

FIGS. 2 and 3 are fragmentary views of the reservoir;

FIG. 6 is a view similar to FIG. 2 but showing a modified master cylinder reservoir.

DESCRIPTION OF THE PREFERRED EMBODIMENT OF THE INVENTION

Figure 4:
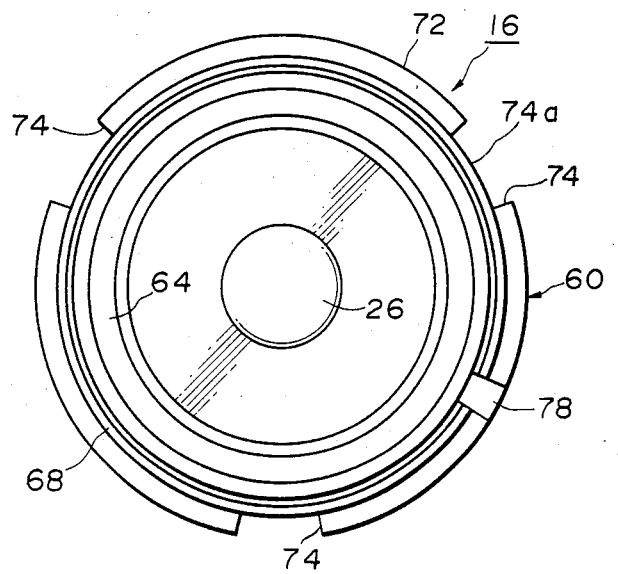
FIG. 4 is a plan view of a diaphragm incorporated in the reservoir.
Figure 5:
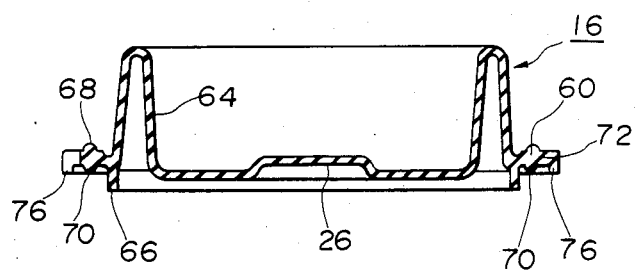
FIG. 5 is a cross-sectional view of the diaphragm.

A master cylinder reservoir 10 shown in FIG. 1 comprises a cylindrical body 12 having a closed bottom, a cup-shaped cap 14 threaded onto an open upper end of the cylindrical body 12, and a diaphragm 16 received in the cap 14 and held between the body 12 and the cap 14. Provided on the inner surface of the bottom wall 18 of the body 12 at its center is a float-mounting portion 20 for mounting a float (not shown) of a fluid level indicator for vertical movement along the axis of the body 12, the float-mounting portion limiting the upward movement of the float which has a magnet means. Also, a reed switch-mounting portion 22 is provided on the outer surface of the bottom wall 18 for mounting a reed switch (not shown) operably by the magnet means of the float. A pair of fluid feed portions 24 and 26 are provided on the periphery of bottom wall 18 in diametrically-opposed relation and are in fluid communication with bosses of a body of a master cylinder (not shown).

The side wall 28 of the cylindrical body 12 is thickened at its upper end to provide a lip portion 30. The lip portion 30 has external threads 32 at its outer surface and has a flat upper surface 30a. A plurality of reinforcement ribs 34 are formed on the outer surface of the side wall 28 adjacent to the lip portion 30 and spaced circumferentially from one another. As best shown in FIGS. 2 and 3, the upper end of the lip portion 30 is removed at its outer surface immediately adjacent to the external threads 32 to provide a peripheral stepped section 36.

The cap 14 has a circular base portion 38, a cylindrical wall 40 extending from the base portion 38 at its periphery, and a mounting portion 42 formed at a lower end of the cap 14. The mounting portion 42 has an annular wall 44 formed circumferentially on the outer surface of the cylindrical wall 40 at its lower end and disposed in a plane perpendicular to the axis of the cylindrical wall 40, and a cylindrical wall 46 of a greater diameter extending from the annular wall 40 at its outer peripheral edge, the cylindrical wall 46 being disposed in concentric relation to the cylindrical wall 40. The cylindrical wall 46 has internal threads 48 formed on its inner surface at its lower end. As best shown in FIG. 3, the inner surface 50 of the cylindrical wall 46 adjacent to the internal threads 48 is disposed radially outwardly of the grooves of the internal threads 48. With this arrangement, that portion of the inner surface 50 adjacent to the internal threads 48 cooperates with the stepped section 36 to define a circumferential annular recess 52. Since the recess 52 is defined by the stepped section 36 and the inner surface 50 of the cylindrical wall 46, the strengths of the mounting portion 42 and lip portion 30 are not adversely affected. Also, a circumferential annular space 54 is defined by the inner surface 44a of the annular wall 44, the inner surface 50 of the cylindrical wall 46 and the the upper surface 30a of the open end of the lip portion 30. The outer portion of the space 54 is circumferentially interrupted by three projections 56 (FIG. 2) formed on the inner surface 50 adjacent to the annular wall 44 and circumferentially spaced equally from one another. Each of the projections 56 has a flat lower surface 56a which is held against the upper surface 30a of the lip portion 30 of the reservoir body 12. The reservoir body 12 and the cap 14 are made of plastics material.

The diaphragm 16 is made of an elastic material such as rubber and comprises a thin sheet except for its peripheral portion 60, so that the diaphragm 16 can be deformed when subjected to a pressure differential created thereacross. The diaphragm 16 has a circular base portion 62, an annular hollow portion 64 of an inverted U-shaped cross-section formed on the periphery of the base portion 62, and the peripheral portion 60 formed on the outer periphery of the hollow portion 64. An annular guide portion 66 is formed circumferentially on the lower surface of the peripheral portion 60 adjacent to the hollow portion 64 and is tightly fitted in the lip portion 30 of the reservoir body 12.

The thickened peripheral portion 60 of the diaphragm 16 is received in the space 54 and is held between the annular wall 44 of the cap 14 and the upper surface 30a of the lip portion 30. First and second beads 68 and 70 are formed on the upper and lower surfaces of the peripheral portion 60, respectively and disposed intermediate the width thereof. The first bead 68 is held in sealing engagement with the lower surface 44a of the annular wall 44 of the cap 14 while the second bead 70 is held in sealing engagement with the upper surface 30a of the lip portion 30. The outer section 72 of the peripheral portion 60 is disposed radially outwardly of the beads 68 and 70.

As best shown in FIG. 4, three notches 74 are formed through the outer section 72 of the peripheral portion 60, the three notches 74 being circumferentially equally spaced from one another. An engaging section 76 depends from the outer end of the outer section 72, the engaging section 76 being circumferentially interrupted by the three notches 74. The engaging section 76 is received in the circumferential recess 52 defined by the stepped section 36 of the lip portion 30 and the inner surface 50 of the cylindrical wall 46 of the cap 14. The three projections 56 of the cap 14 are snugly fitted in the three notches 74 of the diaphragm 16 to prevent the relative rotation between the diaphragm 16 and the cap 14. A groove 78 is formed in the upper surface of the peripheral portion 60 and interrupts the first bead 68, so that a space 80 defined by the cap 14 and the diaphragm 16 is in communication with the atmosphere via the groove 78 and a gap between the mated external and internal threads 32 and 48. Thus, the space 80 is in communication with the atmosphere, and the upper surface of the peripheral portion 60 is not completely held in sealing engagement with the inner surface 44a of the annular wall 44. Therefore, according to a modified form of the invention shown in FIG. 6, the first bead 68 is omitted to provide a flat upper surface 60a of the peripheral portion 60.

For assembling the master cylinder reservoir 10, the diaphragm 16 is first attached to the cap 14 with the projections 56 fitted in the notches 74 respectively. When the diaphragm 16 is attached to the cap 14, the outer section 72 is received in the mounting portion 42. The inner surface 50 of the cylindrical wall 46 is disposed radially outwardly of the grooves of the internal threads 48, and therefore the diaphragm 16 is prevented from becoming disengaged from the cap 14. Then, the cap 14 with the diaphragm 16 is attached to the reservoir body 12 with the mounting portion 42 threaded onto the lip portion 30 through the external and internal threads 32 and 48. As the cap 14 is tightened relative to the reservoir body 12, the former is first rotated relative to latter together with the diaphragm 16 without contacting the reservoir body 12. Then, the annular guide portion 66 is fitted in the open upper end of the reservoir body 12, and the engaging section 76 is received in the circumferential recess 52. Then, the second bead 70 is brought into engagement with the upper surface 30a of the lip portion 30. Finally, the lower surfaces of the projections 56 are brought into engagement with the upper surface 30a of the lip portion 30, thereby limiting a further tightening of the cap 14 relative to the reservoir body 12. In this condition, the peripheral portion 60 of the diaphragm 16 is compressed by the cap 14 and the reservoir body 12 and is held in position against movement.

The area of contact of the peripheral portion 60 with the upper surface 30a of the lip portion 30 is substantially reduced by the provision of the second bead 70, thereby preventing an excessive friction from developing therebetween when assembling the master cylinder reservoir 10. Therefore, the peripheral portion 60 of the diaphragm 16 is not subjected to undue distortion, thereby ensuring an effective sealing of the reservoir body 12 by the diaphragm 16. When attaching the cap 14 with the diaphragm 16 to the reservoir body 12, oil of the same type as the fluid oil to be held in the reservoir body 12 may be applied to one of the second bead 70 and the upper surface 30a of the lip portion 30 to further reduce a friction therebetween, thereby facilitating the assembly of the master cylinder reservoir.

As the tightening of the cap 14 relative to the reservoir body 12 proceeds with the first and second beads 68 and 70 being deformed, the peripheral portion 60 tends to be deformed and forced radially inwardly. At this time, the engaging section 76 is brought into engagement with the stepped section 36 to prevent the peripheral portion 60 from being forced radially inwardly. Further, since the engaging section 76 can be held in engagement with the stepped section 36 throughout the entire peripheral portion 60 except for the three notches 74, the peripheral portion 60 is positively prevented from being forced radially inwardly.

Further, the diaphragm 16 can be attached to the cap 14 in a manner to prevent a relative rotation therebetween. They can be easily attached to the reservoir body 12 merely by threading the cap 14 onto the reservoir body 12.

While the master cylinder reservoir 10 according to the present invention has been specifically shown and described herein, the invention itself is not to be restricted to the exact showing of the drawings or the description thereof. For example, although the circumferential recess 52 is defined by the stepped section 36 and the inner surface 50 of the mounting portion 42, the stepped section 36 may be omitted and instead the inner surface 50 may be spaced from the outer surface of the lip portion by a distance sufficient to form the recess 52. Further, another engaging section may be formed on the upper surface of the outer section 72 of the peripheral portion, and another circumferential recess may be formed in the inner surface of the annular portion 44 so that the engaging section can be received in the circumferential recess. Also, in the illustrated embodiments, although one bead 70 is formed on the lower surface of the peripheral portion 60, two circumferential beads of a smaller width may be formed on the lower surface of the peripheral portion 60.

What is claimed is:

1. A master cylinder reservoir comprising:

(a) a cylindrical body having an open upper end, said body having fluid feed means at a lower end portion thereof;
   (b) a cap fitted on and removably secured to said body by a relative rotation therebetween, said cap engaging said open end of said body a a lower end portion thereof, said cap having a mounting portion formed adjacent to the lower end portion thdreof said mounting portion defining together with an upper surface of said open end of said body a circumferential space, said mounting portion having a first surface disposed in opposed spaced relation to the upper surface of said open end of said body, and said mounting portion of said cap having a second surface disposed in opposed relation to an outer surface of said upper end of said body, the outer surface of said upper end being spaced from said second surface adjacent to the upper surface of said body to form a circumferential recess; and
   (c) a diaphragm received in said cap and having a peripheral portion received in said circumferential space and held between said first surface of said mounting portion and the upper surface of said open end of said body, said peripheral portion having a circumferential bead formed on a lower surface thereof, said bead being held in engagment with the upper surface of said open end of said body providing a seal therebetween and keeping said lower surface of said peripheral portion of the diaphragm apart from said upper surface of said open end of said body to eliminate friction on the peripheral portion during rotation of the cap, and said peripheral portion having an engaging section depending from its outer edge, and said engaging section being received in said circumferential recess for engagement with the outer surface of said upper edd of said body wherein said mounting portion has a plurality of projections formed on said second surface thereof and spaced circumferentially from each other around said second surface, said peripheral portion of said diaphragm having a plurality of notches formed therethrough and spaced from each other circumferentially therearound, said projections being snugly fitted respectively in said notches, the lower surface of each of said projections being held in engagement with the upper surface of said open end of said body.

2. A master cylinder reservoir according to claim 1, in 20 which said second surface of said mounting portion is disposed radially outwardly of an inner surface of the lower end portion of said mounting portion, said upper end portion of said body having a stepped portion formed in the outer surface thereof adjacent to its upper surface, and said stepped portion defining together with said second surface said circumferential recess.

3. A master cylinder according to claim 1 wherein the cap has internal threads, and is secured to the body which has external threads, through a threaded connection.

4. A master cylinder reservoir according to claim 1 wherein the bead extends above the peripheral portion contacting the first surface of the mounting portion and below the peripheral portion contacting the upper surface of said open end of said body, the bead providing an abutment for said surfaces so that neither surface contacts the diaphragm.

* * * * *

UNITED STATES PATENT AND TRADEMARK OFFICE
CERTIFICATE OF CORRECTION

PATENT NO. : 4,658,585
DATED : April 21, 1987
INVENTOR(S) : KATSUAKI KAMEMOTO, HIDEYUKI MORIMOTO It is certified that error appears in the above-identified patent and that said Letters Patent is hereby corrected as shown below:

Column 2, line 52, after "received in the" insert --circumferential space and held between the first surface of the mounting portion and the upper surface of the open end of the body, the peripheral portion having a circumferential bead formed on a lower surface thereof, the bead being held in sealing engagement with the upper surface of the open--.

Column 6, line 37, "edd" should be --end--.

Column 6, line 50, delete "20".

Signed and Sealed this

Third Day of November, 1987

Attest:

DONALD J. QUIGG

Attesting Officer

Commissioner of Patents and Trademarks